J. T. BINKLEY.
LOCKING MECHANISM.
APPLICATION FILED JUNE 10, 1914.
1,145,541.
Patented July 6, 1915.
4 SHEETS—SHEET 1.
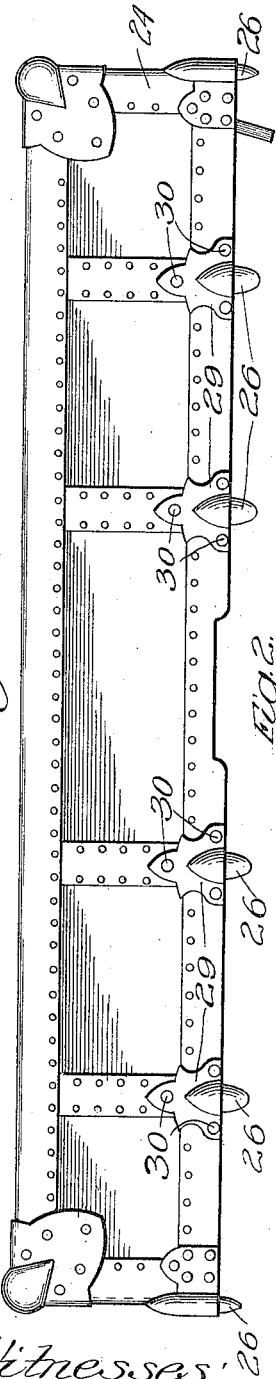
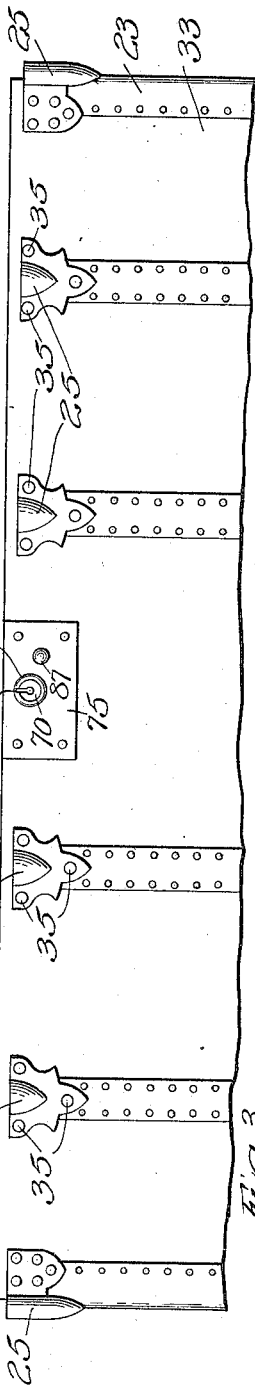
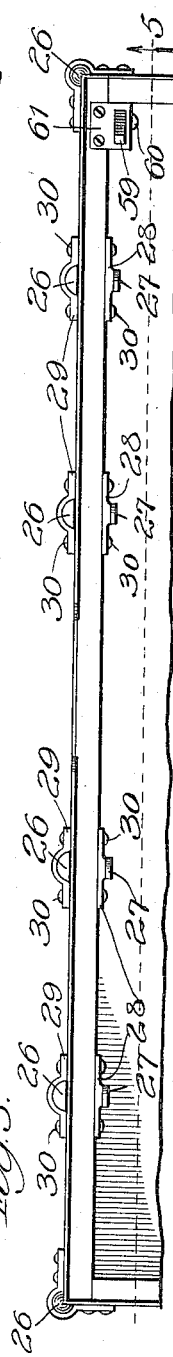
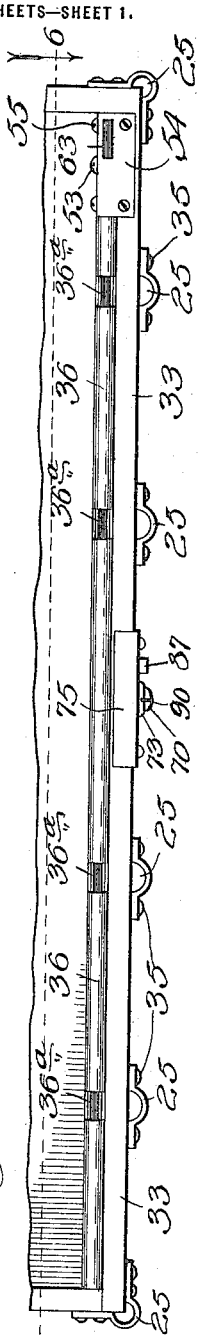
Witnesses:
Inventor:
John T. Binkley, J. T. BINKLEY.
LOCKING MECHANISM.
APPLICATION FILED JUNE 10, 1914.
1,145,541.
Patented July 6, 1915.
4 SHEETS—SHEET 2.
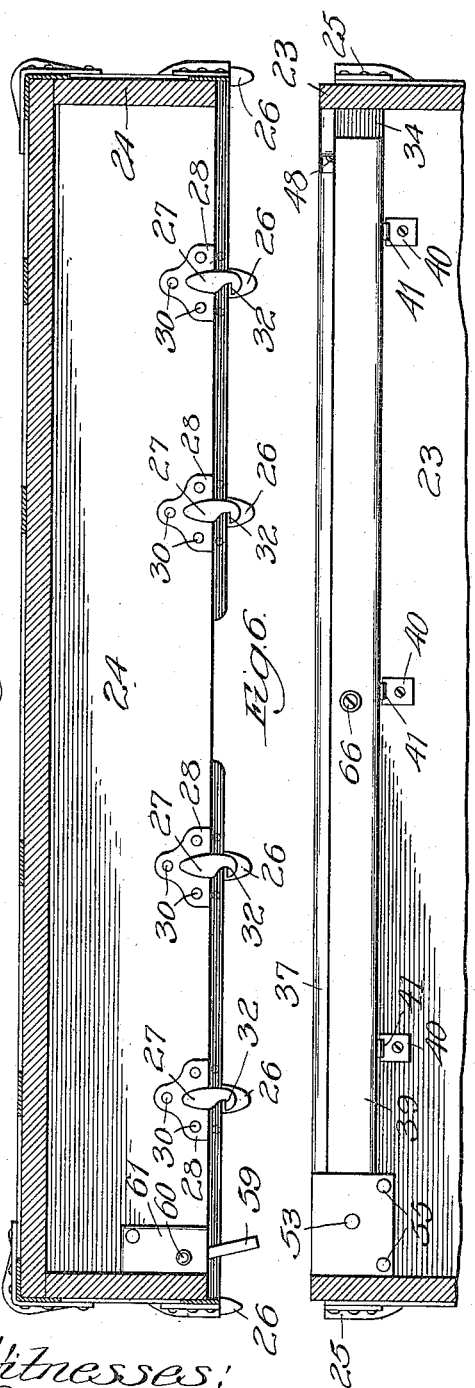
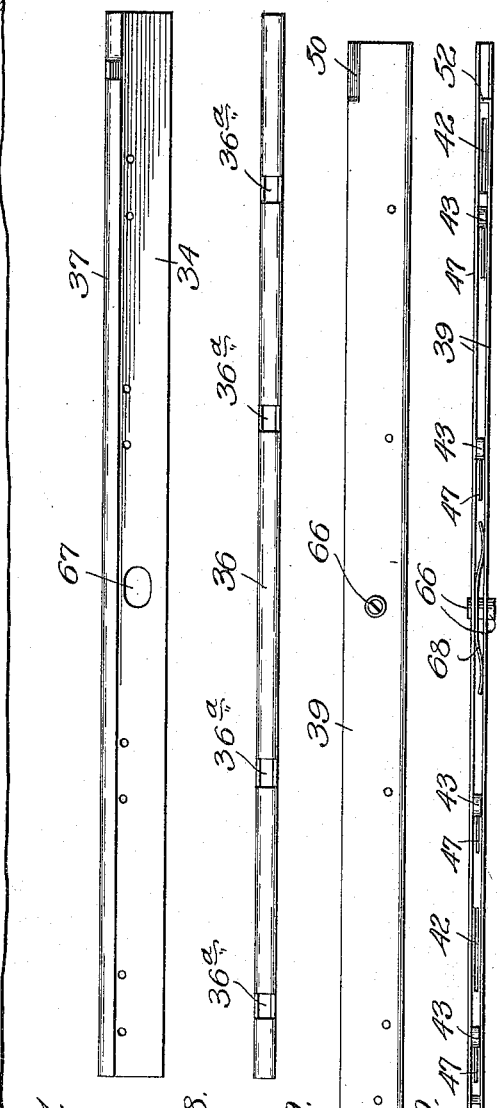

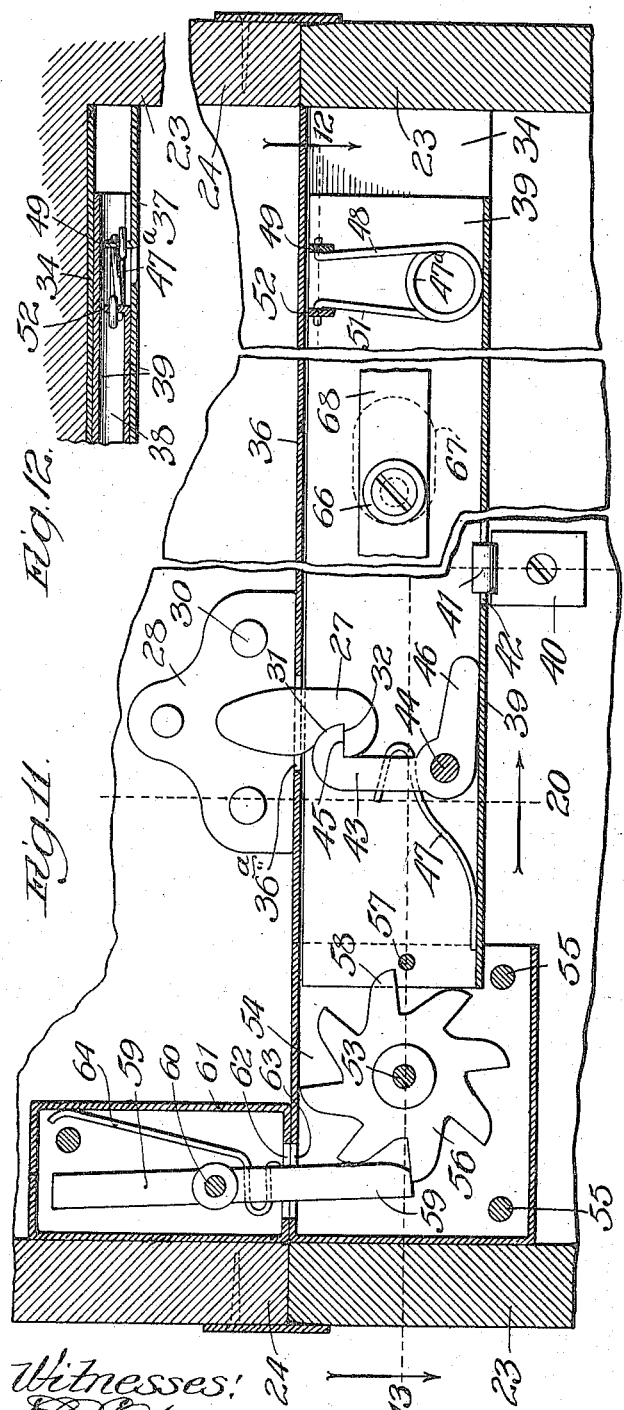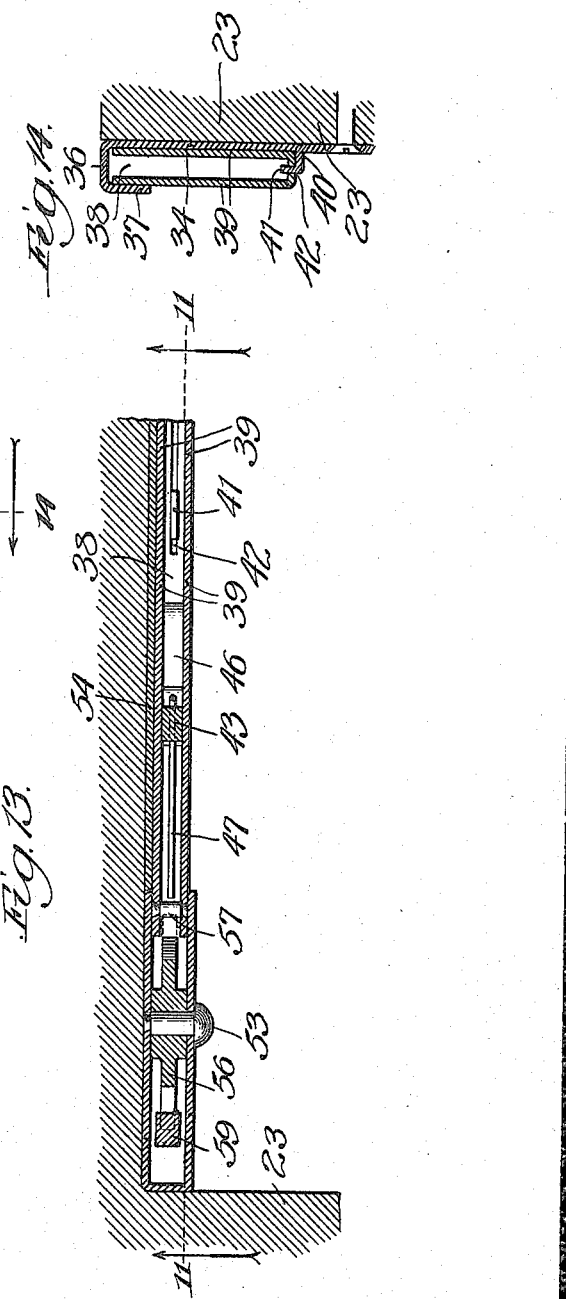

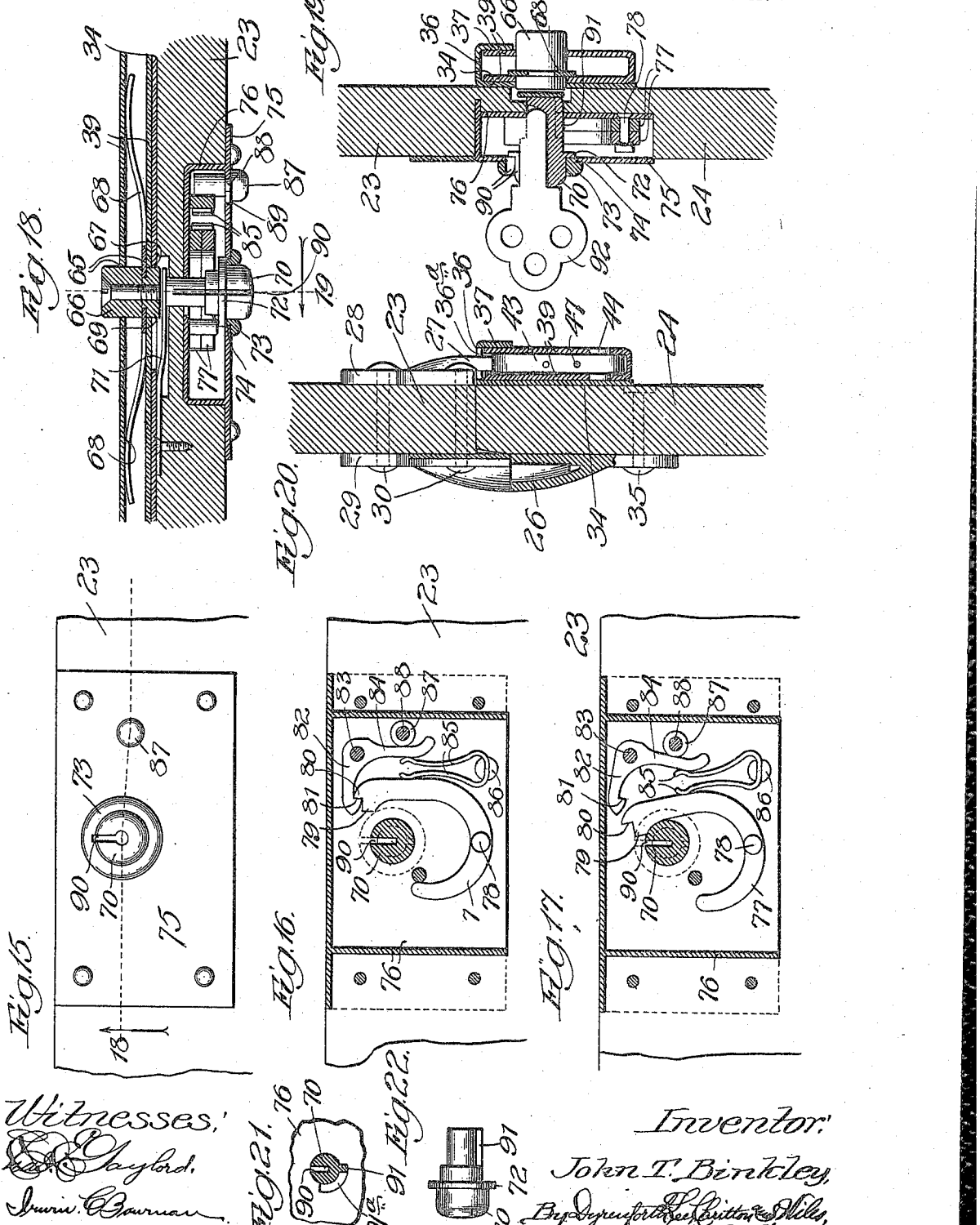

UNITED STATES PATENT OFFICE.

JOHN T. BINKLEY, OF CHICAGO, ILLINOIS.

LOCKING MECHANISM.

1,145,541.  Specification of Letters Patent.  Patented July 6, 1915.

Application filed June 10, 1914. Serial No. 844,159.

*To all whom it may concern:*

Be it known that I, JOHN T. BINKLEY, a citizen of the United States, residing at Chicago, in the county of Cook and State of Illinois, have invented a new and useful Improvement in Locking Mechanism, of which the following is a specification.

My invention relates to improvements in locking mechanism for use more particularly on trunks, suit cases and the like; my object being to provide improved locking means which may be readily and conveniently operated, which will securely lock the sections of the trunk, suit case or other container to which they are applied, and which will present no projections on the outside of the container.

Referring to the accompanying drawings—Figure 1 is a view in front elevation of the cover of a trunk constructed in accordance with my invention. Fig. 2 is a similar view of the upper portion of the body of the trunk. Fig. 3 is a bottom plan view of the forward edge of the cover of the trunk. Fig. 4 is a plan view of the forward edge of the body of the trunk. Fig. 5 is a section taken at the line 5 on Fig. 3 and viewed in the direction of the arrow. Fig. 6 is a section taken at the line 6 on Fig. 4 and viewed in the direction of the arrow. Fig. 7 is a face view, taken in the direction of the arrow in Fig. 4, of a guide-plate employed as a part of the locking means on the body of the trunk. Fig. 8 is a plan view of the plate of Fig. 7. Fig. 9 is a face view of a longitudinally-reciprocable channel-member coöperating with the guide-plate of Fig. 7, this plate being viewed in the direction of the arrow in Fig. 4. Fig. 10 is a top plan view of the channel-member of Fig. 9. Fig. 11 is a broken view in sectional elevation of a portion of the locking means employed, this view, which is taken at the line 11 on Fig. 13 and viewed in the direction of the arrow, showing the cover of the trunk in closed condition. Fig. 12 is a section taken at the line 12 on Fig. 11 and viewed in the direction of the arrow. Fig. 13 is a plan section taken through one end of the locking means at the line 13 on Fig. 11 and viewed in the direction of the arrow. Fig. 14 is a section taken at the line 14 on Fig. 11 and viewed in the direction of the arrow, this view showing the manner of supporting and guiding the channel-member of Figs. 9 and 10. Fig. 15 is an enlarged face view of the key-controlled lock. Fig. 16 is a view, similar to Fig. 15, with the outer cover plate of the locking mechanism removed, this view showing the parts of the lock in the position they assume when the lock is open. Fig. 17 is a view like Fig. 16, showing the parts of the lock in the position they assume when the lock is closed. Fig. 18 is a section taken at the line 18 on Fig. 15 and viewed in the direction of the arrow. Fig. 19 is a section taken at the line 19 on Fig. 18 and viewed in the direction of the arrow. Fig. 20 is a section taken at the line 20 on Fig. 11 and viewed in the direction of the arrow. Fig. 21 is a section taken through the cylinder of the lock; and Fig. 22, a view in side elevation of the lock-cylinder.

In illustrating my invention, I have chosen to show it in connection with, and as locking means for, a trunk, though not with the intention of being understood as intending to limit it to its use in this connection as my improved means has wide application In the construction illustrated, the body-portion of a trunk is represented at 23 and the cover thereof, which would be hinged thereto at its near edge in the usual manner, represented at 24, the body portion containing on its outer surface and near its upper end socket-members 25 into which lugs 26, depending from the cover-section 24, are adapted to enter when the cover is closed, to produce the desired rigidity of the structure. Secured to the inner surface of the cover-section 24 and depending below its lower edge at its front side, are lugs 27, preferably formed integrally with plates 28 which are preferably provided of a number corresponding with the plates 29 carrying the lugs 26 and arranged opposite thereto, whereby the rivets 30 for holding the plates 29 in place on the trunk also serve to hold the plates 28 in position thereon. In the construction shown, four of the lugs 27 are provided, but it will be readily understood that the number thereof may be increased or diminished, as desired. The lugs 27 are each provided in an edge thereof with a recess 31 having preferably a flat bottom surface 32, these lugs which form keepers coöperating at their recessed portions with means on the body of the trunk hereinafter described for preventing the raising of the cover.

Fastened to the body 23 of the trunk on the inner surface of the front side 33 thereof and extending closely adjacent to the upper edge of the side 33, is a plate 34, this plate in the construction shown being rigidly secured to the front side 33 of the body of the trunk by the upper series of rivets 35 passing through the socket-members 25, on the front side of the latter, the plate 34 being provided at its top edge with a rearwardly-projecting flange 36, preferably flush with the upper edge of the trunk-side 33, and having a depending flange 37, the plate 34 thus constructed affording a channel 38 at its upper end, which contains slots 36ª through which the lower ends of the keepers 27 project when the cover 24 is closed. Extending upwardly into the channel 38 is a slide-member 39 of U-shape in cross-section, this member being supported at its lower edge on brackets 40 secured to the inner surface of the trunk-side 33 below the plate 34 and provided with upturned ends 41 which project through elongated slots 42 in the bottom of the member 39, whereby the latter is free to be shifted lengthwise on the trunk-side 33. The member 39 is provided at points closely adjacent to the keepers 27, with catches 43 in the form of dogs located on the inside of said member and pivotally supported on pins 44 secured in the sides of the latter, these dogs, which are adapted to engage at their shouldered surfaces 45 with the shoulders 32 of the keepers 27, being provided with stop-fingers 46, adapted to bear against the bottom portion of the member 39 for limiting the clockwise movement of the dogs 43 in Fig. 11 under the action of springs 47, one of these springs being provided for each dog.

Means are provided tending to normally shift the member 39 and the mechanism carried thereby to the left in Fig. 11, or, in other words, to a position in which the dogs 43 will be out of registration with the shouldered portion 32 of the keepers 27, these means in the construction illustrated comprising a spiral spring 47ª located in the member 39, one end 48 of this spring engaging a lug 49 on the flange 37 of the plate 34 and extending through a slot 50 in the end of the member 39, and the other end 51 of the spring 47 engaging with a lug 52 formed on one of the sides of the member 39, this spring, by reason of its tension, tending to spread apart the lugs 49 and 52, and by reason of the lug 49 being rigid on the trunk body, thus causing the force of the spring to act on the member 39 and force the latter to the left in Fig. 11, excepting as restrained by the mechanism, and under the conditions, hereinafter explained.

In the construction illustrated, means are provided for automatically shifting the member 39 to a position in which the dogs 43 will interlock with the keepers 27, as shown in Fig. 11, upon the act of swinging the cover down upon the body of the trunk, and for releasably holding the member 39 in this position for locking the cover, a description of these means being as follows: Journaled on a pin 53 secured in the sides of a casing 54 secured to the inner surface of the trunk-side 33 at one end of the plate 34, as by screws 55, is a ratchet-wheel 56 adapted to be rotated in anti-clockwise direction in Fig. 11, and coöperating with a cross-pin 57 secured in the sides of the member 39, which latter projects into the casing 54. One edge of each of the ratchet teeth 54 is preferably rounded as indicated at 58 to form cams which are adapted in the rotation of the ratchet 56 to bear against the pin 57 and force the member 39 to the position represented in Fig. 11. Coöperating with the ratchet 56 is a pawl 59 pivoted on a pin 60 secured in the sides of a casing 61 secured to the inner surface of the front side of the trunk-top 24 in a position in which it will superpose the casing 54 when the cover is swung down upon the body of the trunk. The pawl 59 which extends at its lower end through registering openings 62 and 63 in the casings 61 and 54, respectively, coöperates with a spring 64 which tends to swing the pawl 59 at its lower end toward the axis of the ratchet 56, the parts of the construction just described being so arranged that when the cover is raised, the lower end of the pawl 59 will extend above the rear flat surface of one of the teeth of the ratchet 56, whereby upon swinging the cover down upon the body of the trunk, the ratchet 56 will be rotated a distance substantially equal to the distance between adjacent teeth on the ratchet, thus causing one of the teeth of the ratchet to engage its cam surface 58 with the pin 57 and force the member 39 to the right in Fig. 11 to the position therein shown, the tooth thus actuating the member 39, being carried to a position in which its rear flat surface will extend above the pin 57 for preventing the ratchet 56 from presenting any obstruction to the movement to the left in Fig. 11 of the member 39. The dogs 43 are pivoted on the member 39 as described to permit them to turn in an anti-clockwise direction in Fig. 11, against the action of the springs 47, in order that they may spring past the lower ends of the keeper 27 during the movement of the latter to the position of interlocking with these dogs 43.

It will be noted from the foregoing description that the ratchet 56 while operating to shift the member 39 to the position illustrated in Fig. 11 upon closing the cover down, presents no obstruction to the return of the member 39, under the action of the spring 47, to a position in which the dogs 43 do not interlock with the keepers 27. To prevent this return movement of the slide-member 39, I preferably provide the construction illustrated, a description of which is as follows: Mounted in registering openings 65 in the sides of the member 39 is a button 66, which is adapted to extend, when the member 39 is in one position, through an elongated slot 67 in the plate 34, this button being connected with a spring 68 in the member 39 tending to project the end 69 of the button toward the plate 34 and operating when the button 66 opposes the slot 67 to project the end 69 of the button into the latter. The parts of the structure described are so constructed and arranged that when the member 39 is shifted by the ratchet 56 to the right in Fig. 11 to the position therein shown, the end 69 of the button 66 will be brought into registration with the slot 67, and by the action of the spring 68 will be projected into said slot, into interlocking engagement with the end wall of the latter (Fig. 18), thereby releasably holding the member 39 in the position illustrated in Fig. 11, wherein the dogs 43 interlock with the adjacent keepers 27, as illustrated in this figure.

As shown in the drawings, the button 66 is not exposed on the outer side of the trunk, but is adapted to be operated through the medium of a second push-button indicated at 70, this push-button, which alines with the button 66, being backed up by a leaf-spring 71 (Fig. 18), which tends to force the button 70 away from the button 66 and hold it with its flange 72 against a ring 73 fixed in an opening 74 in the front plate 75 of a casing 76, through the rear plate of which casing the button 70 extends. The button 70 forms the rotatable barrel-member of locking mechanism located in the casing 76, this locking mechanism being provided for the purpose of releasably locking the button 70 against inward movement to prevent the button 66 from being forced out of the slot 67.

Any suitable means for releasably locking the button 70 against inward movement may be provided. In the construction illustrated, these means comprise tumblers 77, in the casing 76, pivoted on a pin 78, and adapted to be projected at their ends 79 into interlocking engagement with the flange 72 on the button 70, as represented in Fig. 17. These tumblers are provided at their ends 79 with shoulders 80 which are adapted to interlock with the shouldered portion 81 of a catch 82 journaled on a pin 83, the catch 82 being provided with a finger 84, between which and the shouldered ends of the tumblers 79, a double-ended spring 85, carried by a post 86, is interposed, tending to rotate the tumblers 79 and catch 82 on their pivots in an anti-clockwise direction. The finger 84 bears, under the action of the spring 85, against a button 87 slidably confined at a restricted portion 88 thereof, in a slot 89 in the plate 75. The barrel 70 contains a key-way 90 for receiving a key so formed as to engage with the shouldered ends 79 of the tumblers 77 and swing them out of interlocking engagement with the flange 72, as shown in Fig. 16, in which movement these tumblers ride against the shouldered end 81 of the catch device 82 lifting the latter against the action of the spring 85 and finally interlocking therewith, as illustrated in Fig. 16, in which position the button 87 occupies the position in the slot 89, as represented in Fig. 18.

When the tumblers 77 are in the position last referred to, the button 70 is free to be pushed inwardly for pushing the button 66 out of engagement with the end-wall of the slot 67, assuming that the cover of the trunk is closed in which operation the member 39 was shifted by the ratchet 56 into the position illustrated in Fig. 11, wherein the dogs 43 and lugs 27 interlock, preventing the cover from being raised, it being understood that when the button 70 is operated as just described, the slide 39 is free to slide to the left in Fig. 11 under the action of the spring 47 for disengaging the dogs 43 from the keepers 27 and thereby permitting the cover to be raised.

Assuming that the cover is closed, when it is desired that it be locked against rising, the operator merely slides the button 87 to the left in Figs. 16, 17 and 18, which thus rocks the shouldered end 81 of the latch 82 upwardly, clearing the shoulders 80 on the tumblers 77, which thus permits the spring 85 to force the tumblers at their shouldered ends into interlocking position relative to the flange 72 on the button 70 (Fig. 17), which prevents the button from being pressed inwardly until the proper key has been inserted into the barrel 70 and the key turned to force the tumblers 77 into the position of interlocking with the catch 82 (Fig. 16).

For convenience in operating the barrel 70 to avoid unnecessary movement of the latter, I provide the barrel with a fin 91 which extends into an arc-shaped recess 91$^a$ opening into the aperture in the rear plate of the casing 76 through which the barrel 70 extends. This recess occupies such a position that when the barrel 70 is in the position illustrated in Fig. 16, it will extend closely adjacent to one end of this recess and when the barrel is rotated a sufficient distance to carry the tumbler-actuating portions of the key, represented at 92, into a position for throwing the tumblers 77 to the position illustrated in Fig. 16, the fin 91 will engage with the other end of the wall of the recess 91ª.

While I have illustrated and described a particular form of my improved mechanism, I do not wish to be understood as intending to limit my invention thereto as the same may be variously modified and altered without departing from the spirit of my invention, it being my intention to claim my invention as broadly and as fully as the prior state of the art will permit.

What I claim as new and desire to secure by Letters Patent is:—

1. The combination with a container formed of sections adapted to be closed together, of a keeper on one of said sections, shiftable means on the other of said sections for interlocking with said keeper, yieldable means for holding said shiftable means normally in non-interlocking position relative to said keeper, means operating automatically upon the act of closing together said sections, to shift said shiftable means throughout their movement against the action of said yieldable means into interlocking engagement with said keeper, and means for releasably holding said shiftable means in interlocking position against the tendency thereof to return to normal position.

2. The combination with a container formed of sections adapted to be closed together, of a keeper on one of said sections, a slide member on the other of said sections provided with means for interlocking with said keeper, yieldable means for holding said slide-member normally in non-interlocking position relative to said keeper, means operating automatically upon the act of closing together said sections, to shift the means on said slide-member against the action of said yieldable means into interlocking engagement with said keepers, and means for releasably holding said slide-member in interlocking position.

3. The combination with a container formed of sections adapted to be closed together, of a keeper on one of said sections, shiftable means on the other of said sections for interlocking with said keeper, shiftable in a path transversely of said keeper and normally disposed in non-interlocking position relative to said keeper, and means other than said keeper operating upon the act of closing together said sections to shift said shiftable member from non-interlocking into interlocking position relative to said keeper.

4. The combination with a container formed of sections adapted to be closed together, of a keeper on one of said sections, shiftable means on the other of said sections for interlocking with said keeper, normally disposed in non-interlocking position relative to said keeper, means other than said keeper operating upon the act of closing together said sections to shift said shiftable member from non-interlocking into interlocking position relative to said keeper, and means for releasably holding said shiftable means in interlocking position.

5. The combination with a container formed of sections adapted to be closed together, of a keeper on one of said sections, shiftable means on the other of said sections for interlocking with said keeper, shiftable in a path transversely of said keeper and normally disposed in non-interlocking position relative to said keeper, and means, other than said keeper, on one of said sections adapted to engage said shiftable means upon the act of closing together said sections and shift said shiftable means into interlocking position relative to said keeper.

6. The combination with a container formed of sections adapted to be closed together, of a keeper on one of said sections, shiftable means on the other of said sections for interlocking with said keeper, normally disposed in non-interlocking position relative to said keeper, means, other than said keeper, on one of said sections adapted to engage said shiftable means upon the act of closing together said sections and shift said shiftable means into interlocking position relative to said keeper, and means for releasably holding said shiftable means in interlocking position.

7. The combination with a container formed of sections adapted to be closed together, of a keeper on one of said sections, a shiftable member on the other of said sections for interlocking with said keeper, ratchet-means adapted when actuated to shift said member into interlocking engagement with said keeper, means operating automatically upon the act of closing together said sections to actuate said ratchet-means, and means for releasably holding said shiftable member in interlocking position.

8. The combination with a container formed of sections adapted to be closed together, of a keeper on one of said sections, a shiftable member on the other of said sections for interlocking with said keeper, ratchet-means adapted when actuated to shift said member into interlocking engagement with said keeper, a pawl carried by said first-referred to section and operating automatically upon the act of closing together said sections, to actuate said ratchet, and means for releasably holding said shiftable member in interlocking position.

9. The combination with a container formed of sections adapted to be closed together, of a keeper on one of said sections, a shiftable member on the other of said sections for interlocking with said keeper, means tending to shift said member into non-interlocking position, ratchet-means for shifting said member into interlocking position relative to said keeper, means operating automatically upon the act of closing together said sections to actuate said ratchet-means, and means for releasably holding said shiftable member in interlocking position.

10. The combination with a container formed of sections adapted to be closed together, of a keeper on one of said sections, a shiftable member on the other of said sections for interlocking with said keeper, means tending to shift said member into non-interlocking position, a ratchet pivoted on the one of said sections which carries said shiftable member, a projection on said shiftable member extending into the path of movement of the teeth on said ratchet, means operating automatically upon the act of closing together said sections to rotate said ratchet and thereby shift said shiftable member against the action of said first-named means and move said ratchet to a position in which said projection will be opposed to a space between adjacent teeth of said ratchet, and means for releasably holding said shiftable member in interlocking position.

11. The combination with a container formed of sections adapted to be closed together, of a keeper on one of said sections, a slidable member on the other of said sections and carrying a pivotally-supported catch adapted to interlock with said keeper, said member being slidable in a path transversely of said keeper, and means operating automatically upon the act of closing together said sections, to shift said shiftable member into a position for causing said catches and keeper to interlock.

12. The combination with a container formed of sections adapted to be closed together, of a keeper on one of said sections, a slidable member on the other of said sections slidable in a path transversely of said keeper and carrying a pivotally supported catch adapted to interlock with said keeper, means operating automatically upon the act of closing together said sections, to shift said slidable member into a position for causing said catch and keeper to interlock, and means for releasably holding said slidable member in catch-interlocking position.

13. The combination with a container formed of sections adapted to be closed together, of a keeper on one of said sections, a slidable member on the other of said sections slidable in a path transversely of said keeper, a spring-controlled catch pivotally connected with said slidable member and adapted to interlock with said keeper, and means operating automatically upon the act of closing together said sections to shift said shiftable member into a position for causing said catch and keeper to interlock.

14. The combination with a container formed of sections adapted to be closed together, of a keeper on one of said sections, a shiftable member on the other of said sections carrying a catch for interlocking with said keeper, said member being shiftable in a path transversely of said keeper, means operating automatically upon the act of closing together said sections, to shift said shiftable member to a position for interlocking said catch with said keeper, and push-button-release means engaging said shiftable member for releasably locking the latter against movement in a direction for disengaging said catch from said keeper.

15. The combination with a container formed of sections adapted to be closed together, of a keeper on one of said sections, a member on the other of said sections adapted to be moved into and out of interlocking engagement with said keeper, a key-operated member coöperating with said first-named member for controlling its movement to noninterlocking position, tumbler-means controlling the movement of said key-operated member, and means, operable independently of said key-operated member, for shifting said tumbler-means into position for releasably locking said key-operated member against actuation.

16. The combination with a container formed of sections adapted to be closed together, of a keeper on one of said sections, a member on the other of said sections adapted to be moved into and out of interlocking engagement with said keeper, a key-operated push-button coöperating with said first-named member for controlling its movement to non-interlocking position, tumbler-means controlling the movement of said key-operated push-button, and means, operable independently of said key-operated push-button, for shifting said tumbler-means into position for releasably locking said key-operated push-button against actuation.

17. In a lock, the combination of a key-controlled push-button, tumbler-means adapted when in one position to prevent longitudinal movement of said push-button, means tending to shift said tumbler-means into a position in which said button is prevented from being moved longitudinally, means for releasably holding said tumbler-means in retracted position, and means for releasing said last-named means.

18. In a lock, the combination of a key-controlled member, tumbler-means coöperating therewith and adapted when in one position to prevent longitudinal movement of said member, means tending to shift said tumbler-means into a position in which it will prevent longitudinal movement of said member, a pivoted catch adapted to releasably hold said tumber-means in retracted position, and means for releasing said catch.

19. In a lock, the combination of a key-controlled push-button, tumbler-means cooperating therewith and adapted when in one position to prevent said button from being moved longitudinally, means tending to move said tumbler-means to said position, a pivoted catch releasably holding said tumbler-means in retracted position, means tending to swing said catch into interlocking engagement with said tumbler-means, and means for rocking said catch into releasing position.

20. In a lock, the combination of a key-controlled push-button, tumbler-means adapted when in one position to prevent longitudinal movement of said button and movable out of such position by a key introduced into said button, means for releasably holding said tumblers in retracted position, a stop provided on said button, and means engaging with said stop for limiting rotation of said button.

21. The combination with a container formed of sections adapted to be connected together, of a keeper on one of said sections, a slide-member on the other of said sections provided with a catch, said slide-member being shiftable in a path transversely of said keeper and normally disposed in a position for causing said catch to be in noninterlocking position relative to said keeper, and means operating upon the act of closing together said sections to shift said slide-member to carry said catch from non-interlocking into interlocking position relative to said keeper.

22. The combination with a container formed of sections adapted to be connected together, of a keeper on one of said sections, a slide-member on the other of said sections provided with a catch, said slide-member being shiftable in a path transversely of said keeper and normally disposed in a position for causing said catch to be in non-interlocking position relative to said keeper, means operating upon the act of closing together said sections to shift said slide-member to carry said catch from non-interlocking into interlocking position relative to said keeper, and means for releasably holding said slide-member in a position wherein said catch and keeper interlock.

23. The combination with a container formed of sections adapted to be closed together, of a keeper on one of said sections, a slide-member on the other of said sections and carrying a catch, said slide-member being shiftable in a path transversely of said keeper and normally disposed in a position wherein said catch is in non-interlocking position relative to said keeper, and means on one of said sections adapted to engage said slide-member upon the act of closing together said sections and shift said slide-member into a position wherein said catch extends into interlocking position relative to said keeper.

24. The combination with a container formed of sections adapted to be closed together, of a keeper on one of said sections, a slide-member on the other of said sections and carrying a catch, said slide-member being shiftable in a path transversely of said keeper and normally disposed in a position wherein said catch is in non-interlocking position relative to said keeper, means on one of said sections adapted to engage said slide-member upon the act of closing together said sections and shift said slide-member into a position wherein said catch extends into interlocking position relative to said keeper, and means for releasably holding said slide-member in a position wherein said catch interlocks with said keeper.

JOHN T. BINKLEY.

In presence of—
GEORGE A. CHRITTON,
L. HEISLAR.

Copies of this patent may be obtained for five cents each, by addressing the "Commissioner of Patents, Washington, D. C."